(No Model.) 2 Sheets—Sheet 1.
D. T. HARRIS & V. R. SMITH.
COTTON PLANTER.
No. 434,985. Patented Aug. 26, 1890.
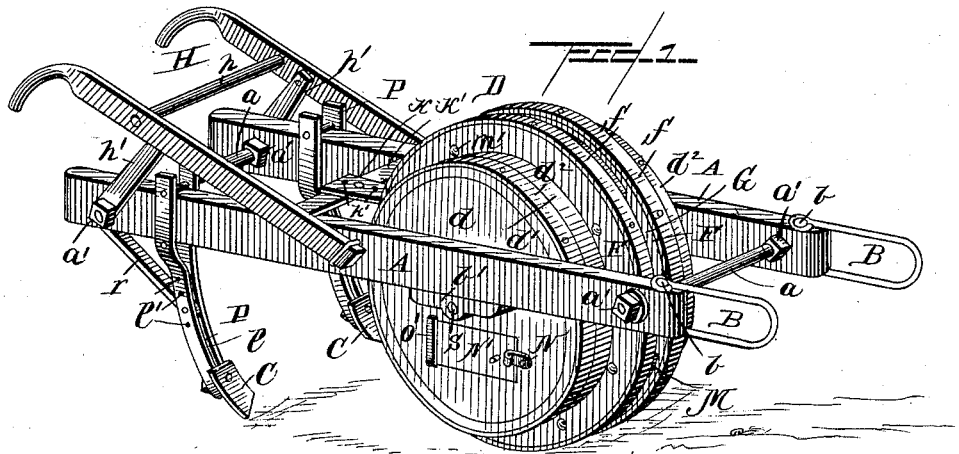
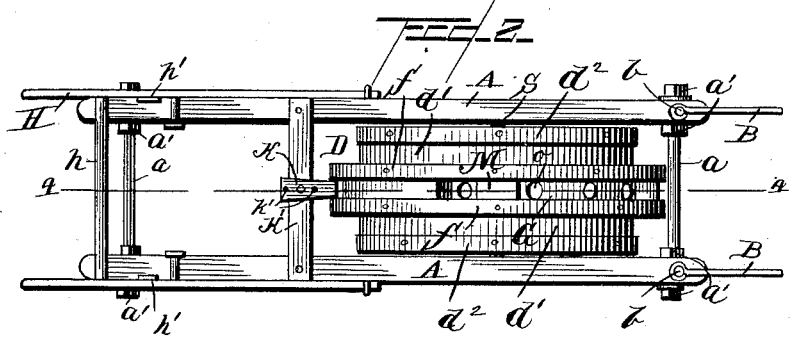
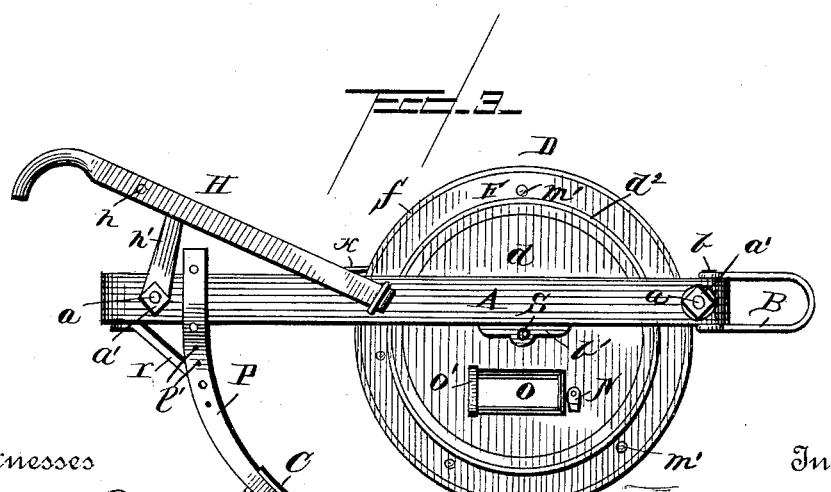
Witnesses
Henry G. Dieterich
Wm. J. Little
Inventors:
D. T. Harris & V. R. Smith,
By their Attorney,
J. R. Littell (No Model.) 2 Sheets—Sheet 2.
D. T. HARRIS & V. R. SMITH.
COTTON PLANTER.
No. 434,985. Patented Aug. 26, 1890.
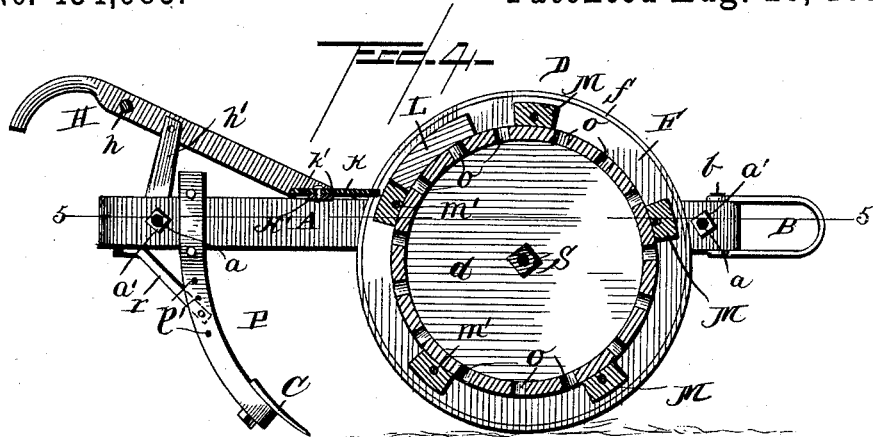
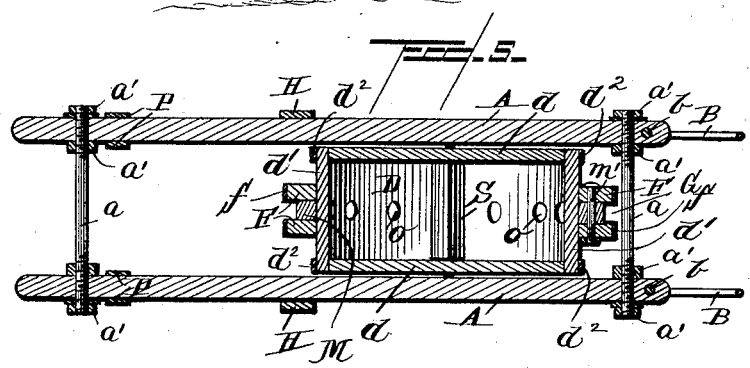
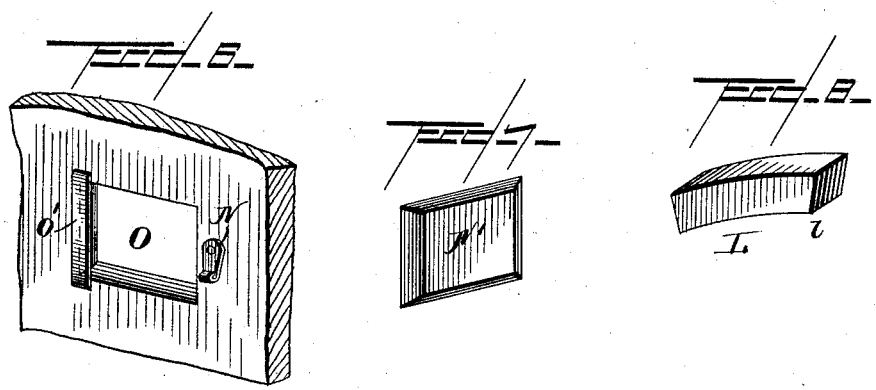
Witnesses
Henry G. Dieterich
Wm. J. Little
Inventors:
D. T. Harris & V. R. Smith,
By their Attorney,
J. R. Little,

UNITED STATES PATENT OFFICE.

DAVID T. HARRIS AND VIRGIL R. SMITH, OF DAWSON COUNTY, ASSIGNORS TO C. D. SMITH AND J. T. SMITH, OF HALL, GEORGIA.

COTTON-PLANTER.

SPECIFICATION forming part of Letters Patent No. 434,985, dated August 26, 1890.

Application filed August 17, 1889. Serial No. 321,087. (No model.)

*To all whom it may concern:*

Be it known that we, DAVID T. HARRIS and VIRGIL R. SMITH, both residing in the county of Dawson and State of Georgia, have invented an Improved Seed-Planter, of which the following is a full, clear, and exact description, such as will enable others skilled in the art to make and use the same.

Our invention relates to that class of seed-planters in which the seed are carried within a perforated drum or hopper journaled within a suitable frame and adapted to roll along the ground and drop the seed through the said perforations.

The object of our invention is to produce a planter which shall be simple in construction and operation, durable, and devoid of complex and expensive parts.

With these objects in view our invention consists in the novel construction and combination of the various parts, as will be more fully hereinafter set forth.

In the accompanying drawings, Figure 1 is a perspective view of our improved planter. Fig. 2 is a top plan view. Fig. 3 is a side view. Fig. 4 is a vertical longitudinal section taken on the plane of the line 4 4 of Fig. 2. Fig. 5 is a horizontal section taken on the line 5 5 of Fig. 4. Figs. 6, 7, and 8 show details of construction.

Referring to the drawings, in which similar letters of reference indicate similar parts in all the figures, A A indicates the two parallel side beams held apart and braced at each end by the rods or bars $a$ $a$, threaded at their ends and carrying the nuts $a'$ $a'$ upon either side of the beam, suitable washers being interposed between the outer sides of the beams and the nuts $a'$ at the forward end of the frame. Attached to the sides of the beams at a short distance to the rear of their center are the handles H H, braced near their upper ends, as usual, by the cross-bar $h$. The handles are further braced from vertical movement by the supporting brace-rods $h'$ $h'$, each joined at one end to the handle just below the cross-bar $h$, the lower end of each of said brace-rods being perforated and passed over an end of the rear rod or bar $a$ and secured by the nuts, as shown, thus serving also as a washer for these nuts.

Near the rear ends of beams A A and forward of the supporting brace-rods $h'$ $h'$ are secured the plow-standards P P, said standards being constructed of metal and of the slotted or U-shaped style, having a slot $p$ extending its entire length and closed at the bottom, as shown. The upper end of the standard is opened to admit the beam between the members of the same, and to secure it in place has two parallel horizontal bolts or rivets connecting them, said bolts being arranged, respectively, above and below the beam, as shown. The plow-standards are each braced by an inclined bar or rod $r$, having its upper end upset, as shown, and secured to the under side of the beam at its extreme rear end, said bar extending downward, its lower end passing between the members of the standard, where it is secured by a bolt or rivet passing through the standard and bar $r$.

To provide for an adjustment of the standard, a series of horizontal registering apertures $p'$ are formed in the members of said standard, adapted to receive the retaining-bolt.

At the lower ends of the standards are secured the covering-plows C C, said plows being of the usual shovel form, and each carrying a bolt on the under side adapted to work in the slot of the standard and supplied with a suitable nut, whereby the covering-plow can be readily adjusted both vertically and at an angle to the standard.

A suitable opening-plow may be secured to the front end of the frame in any well-known manner, or it may be dispensed with, as desired.

At the front end of each beam A A is pivoted a clevis B, formed of a rod or bar bent upon itself at its center, and having eyes at either end arranged to rest on opposite sides of the beam, and through which passes the retaining pivotal bolt $b$, thus forming a cheap, simple, and durable clevis. Near the center of the beams, on the lower sides of the same, are secured the bearings $b'$ $b'$, in which are journaled the ends of the revolving shaft S, upon which is mounted the seed drum or hopper D.

The drum or hopper D is constructed of the circular side pieces or disks $d$ $d$, through which the shaft S passes, and to the peripheries of said side pieces or disks are secured the curved or cylindrical sides $d'$ $d'$, thus forming a complete cylinder or drum. Around the outer edges of the cylindrical surface are placed the metallic bands $d^2$ $d^2$, which greatly strengthen the drum, the bolts or screws securing the curved sides to the disks passing also through these bands, if desired. One of the disks or side pieces $d$ has an opening O cut therein for the introduction of seed, &c., said opening being preferably rectangular in shape and having its edges beveled outwardly, as shown, and across one of the beveled ends is secured the keeper or strip O'. At the opposite end is pivoted the catch or turn-button N. The door or closure N' consists of a single piece shaped similar to the opening O, and has its edges beveled inwardly to correspond with the beveled sides of said opening, and in operation it is placed in the same, so that one end rests under the keeper O', while on the other is turned the catch or button N.

Midway the edges of the cylindrical surface of the drum is formed a series of perforations $o$, at regular intervals, for the discharge of the seed within the hopper, said perforations extending preferably entirely around the drum. At either side of said perforations are arranged the vertical parallel rims or fellies F, upon which the drum or hopper rolls, said rims or fellies being made of any desired number of sections, and having the tires or bands $f$ secured to their outer faces. These rims are secured to the drum in any suitable manner, and when the drum is made of metal they may be made integral therewith. The rims, arranged on each side of the perforations and parallel, form a groove G for the deposit of the seed, and to maintain the uniformity of width of said groove and to brace the rims we place the strengthening-blocks M M at regular intervals and secure the same by means of bolts $m'$, passing through the rims and blocks, said blocks being shorter than the height of the rims. When the drum is made of metal, these blocks may also be made integral therewith, if desired.

The planter as now constructed is what is termed a "drill-seeder," and in order to quickly change it into a hill-seeder we employ a stop-block L, adapted to fit in the groove G and close the desired number of perforations $o$. The groove being divided into sections by the blocks M M, it is obvious that the stop-blocks L cannot be longer than one section. The blocks L L are constructed of a single piece of wood or other material, of a width to snugly fit the groove G, and has its under side curved inwardly at $l$ to correspond with the surface of the drum, and its upper side is so shaped as not to interfere with the revolution of the hopper. The groove G frequently becomes clogged with earth, and to clean the same we employ an adjustable cleaner K, said cleaner consisting of a flat piece of metal or other material pivotally secured to a cross-beam K', attached to the side beams A A a short distance to the rear of the rolling hopper, the free end of the cleaner being slightly tapered and working in the groove, adapted to free the same from earth and foreign matter, and to permit its adjustment the rear end has a series of perforations $k'$, as shown. The cleaner is free to swing from one side of the groove to the other, so that in case any obstruction is met with the cleaner or drum will not receive a sudden check which may injure the machine.

While we have only shown and described the drum as being cylindrical, it is obvious that other forms will answer also, and that we may make certain other changes without departing from the broad principles of our invention.

The operation of our improved planter is at once apparent to all skilled in the art to which it pertains, and its advantages will be readily appreciated. It is cheap, simple, and durable in construction, has no complex parts to get out of order, and can be quickly transformed from a drill-seeder to a hill-seeder. It is self-cleaning, and it plants and covers at one operation.

We are aware that cotton-planters have heretofore been constructed embodying rolling hoppers provided with means for regulating the feed of the seed; also that such hoppers have embodied peripheral flanges between which project cleaning-plates; but to such constructions we lay no claim, our invention consisting in our improved construction and arrangement as set forth in the following claims.

What we claim is—

1. In a seed-planter provided with coverer-plows, the combination, with a rolling hopper provided at its periphery with independent feed-perforations and peripheral flanges or fellies at each side of the latter, of one or more independent stop-blocks conforming in contour to the periphery of the hopper and adapted to be wedged between said flanges or fellies and over the perforations, substantially as and for the purpose set forth.

2. In a seed-planter, the combination, with a rolling hopper provided with correspondingly-peripheral flanges or fellies and with feed-perforations between the same, of one or more independent stop-blocks adapted to be wedged between the flanges and over the perforations, and a cleaning-plate projecting between the flanges, substantially as and for the purpose set forth.

In testimony whereof we affix our signatures in presence of two witnesses.

DAVID T. HARRIS.
    VIRGIL R. SMITH.

Witnesses:
  H. L. MARTIN,
  W. D. HIGGINS.